(12) United States Patent
Baik et al.

(10) Patent No.: US 12,214,640 B2
(45) Date of Patent: Feb. 4, 2025

(54) PNEUMATIC ADJUSTMENT APPARATUS AND METHOD FOR VEHICLE

(71) Applicant: HYUNDAI MOBIS CO., LTD., Seoul (KR)

(72) Inventors: Sang Hoon Baik, Yongin-si (KR); Jong Woo Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 59 days.

(21) Appl. No.: 18/186,589

(22) Filed: Mar. 20, 2023

(65) Prior Publication Data

US 2024/0181832 A1  Jun. 6, 2024

(30) Foreign Application Priority Data

Dec. 1, 2022 (KR) .................. 10-2022-0165716

(51) Int. Cl.
  *B60G 17/056* (2006.01)
  *F04C 2/10* (2006.01)
(52) U.S. Cl.
  CPC .......... *B60G 17/0565* (2013.01); *F04C 2/103* (2013.01); *B60G 2202/152* (2013.01); *B60G 2500/302* (2013.01); *B60G 2800/914* (2013.01)
(58) Field of Classification Search
  CPC .......... B60G 17/0565; B60G 2202/152; B60G 2500/302; B60G 2800/914; F04C 2/103
  See application file for complete search history.

(56) References Cited

U.S. PATENT DOCUMENTS

| | | | |
|---|---|---|---|
| 10,967,697 B2* | 4/2021 | Yoshida | B60G 17/056 |
| 11,590,819 B2* | 2/2023 | Letizio | B60G 17/0523 |
| 2019/0100070 A1* | 4/2019 | Ito | B60G 17/0525 |
| 2021/0387500 A1* | 12/2021 | Letizio | B60G 17/0565 |
| 2022/0314728 A1* | 10/2022 | Borgemenke | B60G 17/0565 |

FOREIGN PATENT DOCUMENTS

CN  110481260 A  11/2019

OTHER PUBLICATIONS

German Office Action issued on Nov. 17, 2023, in counterpart German Patent Application No. 10 2023 105 291.8 (7 pages in German).

* cited by examiner

*Primary Examiner* — Faye M Fleming
(74) *Attorney, Agent, or Firm* — NSIP Law

(57) ABSTRACT

Disclosed herein is a pneumatic adjustment apparatus for a vehicle. The pneumatic adjustment apparatus includes a block including a flow path formed therein, the flow path being configured for a fluid to move through the block, a compressor coupled to the block and configured to communicate with the flow path and to compress the fluid, a driver coupled to the block, connected to the compressor, and configured to drive the compressor, and a controller coupled to the block and configured to open and close the flow path.

19 Claims, 11 Drawing Sheets

PNEUMATIC ADJUSTMENT APPARATUS AND METHOD FOR VEHICLE

CROSS-REFERENCE TO RELATED APPLICATION

This application claims the benefit under 35 USC § 119(a) of Korean Patent Application No. 10-2022-0165716, filed on Dec. 1, 2022, in the Korean Intellectual Property Office, the entire disclosure of which is incorporated herein by reference for all purposes.

BACKGROUND

1. Field

The present disclosure relates to a pneumatic adjustment apparatus and method for a vehicle, and more particularly, to a pneumatic adjustment apparatus and method for a vehicle, which can suppress vibration and noise and can increase a vehicle height adjustment speed and supply pneumatic pressure by applying a closed pneumatic circuit.

2. Description of Related Art

Generally, a suspension apparatus improves ride comfort and vehicle stability by reducing an impact or vibration that is affected by a road surface during driving. Such a suspension apparatus includes a chassis spring, a shock absorber for improving ride comfort by controlling eigenvibration of the chassis spring, and a stabilizer for preventing the rolling of a vehicle.

Conventionally, in the suspension apparatus of a vehicle, when an electronic control unit generates a control signal, a compressor compresses air and supplies compressed air to a bellows type air spring fixed to a vehicle body. The bellows type air spring adjusts the high and low of a vehicle body by pneumatic pressure that is supplied by the compressor.

However, the conventional compressor has a problem in that upon operation, the conventional compressor causes great vibration and noise because it uses a reciprocating piston system. Furthermore, the conventional compressor has a problem in that it is difficult to use an internal space of a vehicle because the compressor and a valve block are separate parts. Accordingly, there is a need to solve the problems.

SUMMARY

In one general aspect, a pneumatic adjustment apparatus for a vehicle includes a block including a flow path formed therein, the flow path being configured for a fluid to move through the block, a compressor coupled with the block and configured to communicate with the flow path and to compress the fluid, a driver coupled with the block, connected to the compressor, and configured to drive the compressor, and a controller coupled with the block and configured to open and close the flow path.

The block may include a block housing disposed between the compressor and the controller, wherein the flow path may be at least partially formed within the block housing, a block support may be disposed in the block housing and configured to support the compressor so that the compressor is rotatable, and a block seal may be disposed in the block support, in close contact with the compressor, and configured to maintain airtightness.

The block part may include a block O-ring disposed between the block support and the controller and configured to maintain airtightness.

The compressor may include a fixer coupled with a top of the block, a rotator rotatable within the fixer, and a transferor inserted into the block and configured to transfer rotatory power by connecting the rotator and the driver.

The driver may include a motor coupled with a bottom of the controller, and a drive shaft rotated by the motor and connected to the transferor by the controller.

The controller may include a controller housing disposed between the block and the driver, a control valve mounted on the controller housing and configured to open and close the flow path, and a control board mounted on the controller housing and configured to control the control valve.

The pneumatic adjustment apparatus for a vehicle may further include a dryer disposed under the controller, connected to the compressor, and configured to dry the fluid.

The dryer may include a dryer housing mounted on a bottom of the controller and configured to dry the fluid, and a dryer line configured to penetrate the controller and the block and guide the fluid by connecting the compressor and the dryer housing.

The pneumatic adjustment apparatus for a vehicle may further include a storage tank connected to the block and configured to store the fluid, and a vehicle height adjustor connected to the block and configured to change a height of a vehicle body responsive to pneumatic pressure applied thereto.

The flow path may include a first flow path connecting a storage tank and a first valve, a second flow path connecting the first valve and a second valve, a third flow path connecting the second valve and the vehicle height adjustor and opened and closed by a third valve, a fourth flow path connecting the second flow path and the first valve and to guide the fluid to the compressor and the dryer, and a fifth flow path connecting the fourth flow path and the second valve.

In another general aspect, a pneumatic adjustment apparatus for a vehicle includes a block including a flow path at least partially formed therein, the flow path configured for a fluid to move through the block, a compressor coupled to the block and configured to communicate with the flow path and to compress the fluid, a driver coupled with the block, connected to the compressor, and configured to drive the compressor, and a controller coupled with the block and configured to open and close the flow path, a dryer disposed under the controller, connected to the compressor, and configured to dry the fluid, a storage tank connected to the block and configured to store the fluid, and a vehicle height adjustor connected to the block and configured to change a height of a vehicle body by pneumatic pressure. The block is disposed under the compressor, the controller is disposed under the block, and the driver is disposed under the controller.

The block part may include a block housing comprising a block flow path and a block compressor housing, the block flow path being disposed between the compressor and the controller and configured to have the flow path formed therein and to guide the fluid, the block compressor housing being configured to provide an operating space of the compressor, a block support disposed in the block housing, configured to protrude downward from the block compressor housing and to support the compressor so that the compressor is rotatable, and inserted into the controller, and a block seal disposed in the block support, brought into close contact with the compressor, and configured to maintain airtightness.

The block part may further include a block O-ring part disposed between the block support and the controller and configured to maintain the airtightness.

The compressor may include a fixer coupled to a top of the block and configured to cover an upper opened space of the block compressor housing, a rotator rotatable within the fixer, and a transferor inserted into the block and configured to transfer rotatory power by connecting the rotator and the driver.

The transferor may be configured to be rotated by being connected to the driver that penetrates the controller and the block support, and may be supported against a support bearing.

The driver may include a motor coupled with a bottom of the controller, and a drive shaft rotated by the motor and connected to the transferor through the controller.

The controller may include a controller housing disposed between the block and the driver, a control valve mounted on the controller housing and configured to open and close the flow path, and a control board mounted on the controller housing and configured to control the control valve.

The controller housing may include a control manipulator configured to provide an operating space of the control valve, and a control mount configured to provide a mounting space of the block and the driver. The control manipulator and the control mount may be integrally formed.

The motor may be mounted under the control mount, the block support may be configured to be inserted into an upper side of the control mount, and the drive shaft may be connected to the transferor embedded in the block support through the control mount.

In another general aspect, a method of adjusting pneumatic pressure for a vehicle includes detecting, by one or more processors, a vehicle driving state, compressing, by a compressor, a fluid when a driver is driven in response to a control signal of a controller that receives a detection signal of the detection part, wherein a block, the compressor, the driver, and the controller form an integrated module, and adjusting a vehicle height based on either moving the fluid to a storage tank, or implementing a vehicle height adjustor.

Figure 1:
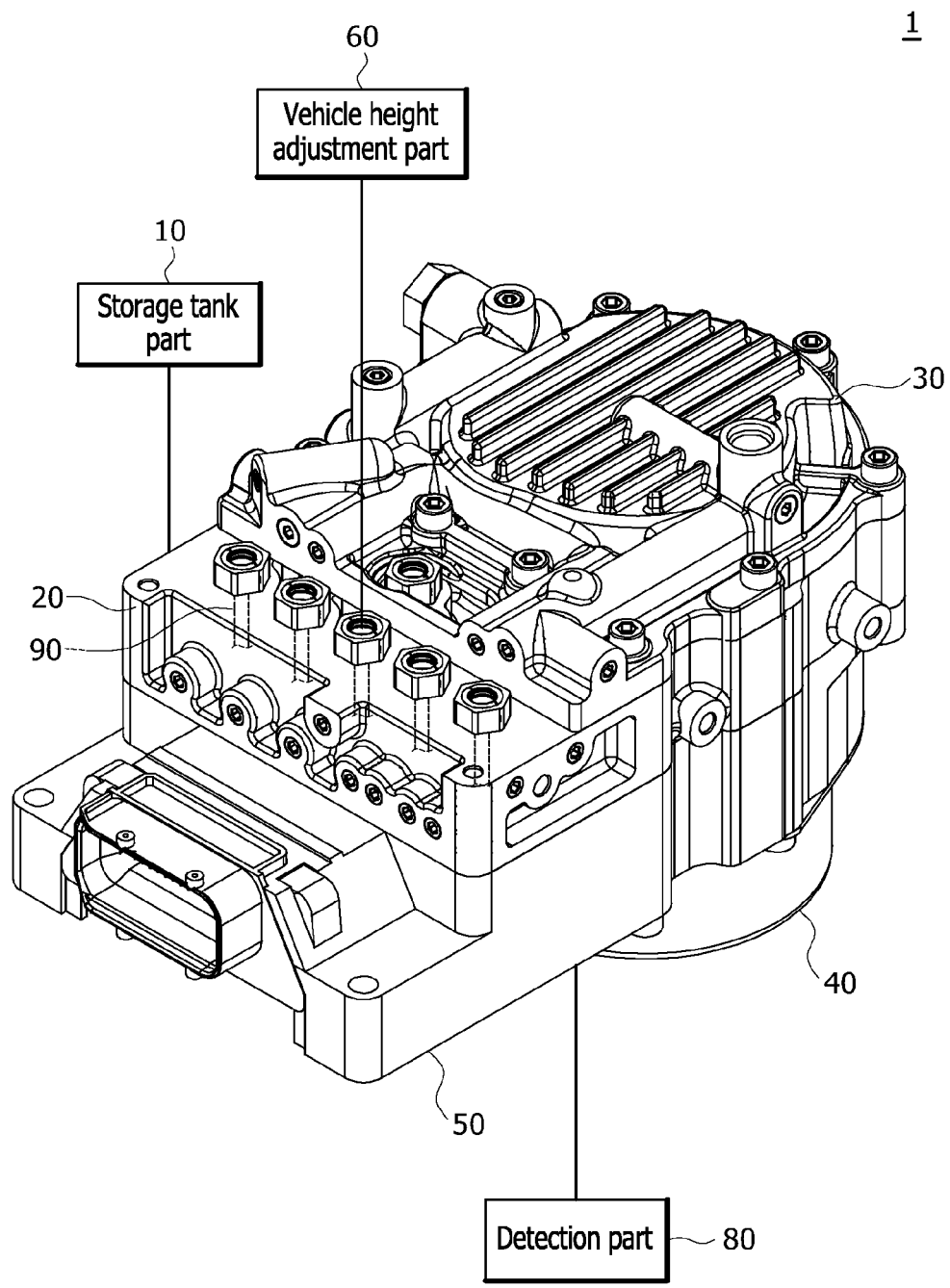
FIG. 1 is a coupled perspective view schematically illustrating a pneumatic adjustment apparatus for a vehicle according to an embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is adequately disclosed, and a person with ordinary skill in the art can fully understand the scope of the present disclosure. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, a pneumatic adjustment apparatus and method for a vehicle will be described below with reference to the accompanying drawings through various embodiments. In this process, the thicknesses of lines or the sizes of elements illustrated in the drawings may have been exaggerated for the clarity of a description and for convenience' sake. Terms to be described below have been defined by taking into consideration their functions in the present disclosure, and may be changed depending on a user or operator's intention or practice. Accordingly, such terms should be defined based on the overall contents of this specification.

Figure 2:
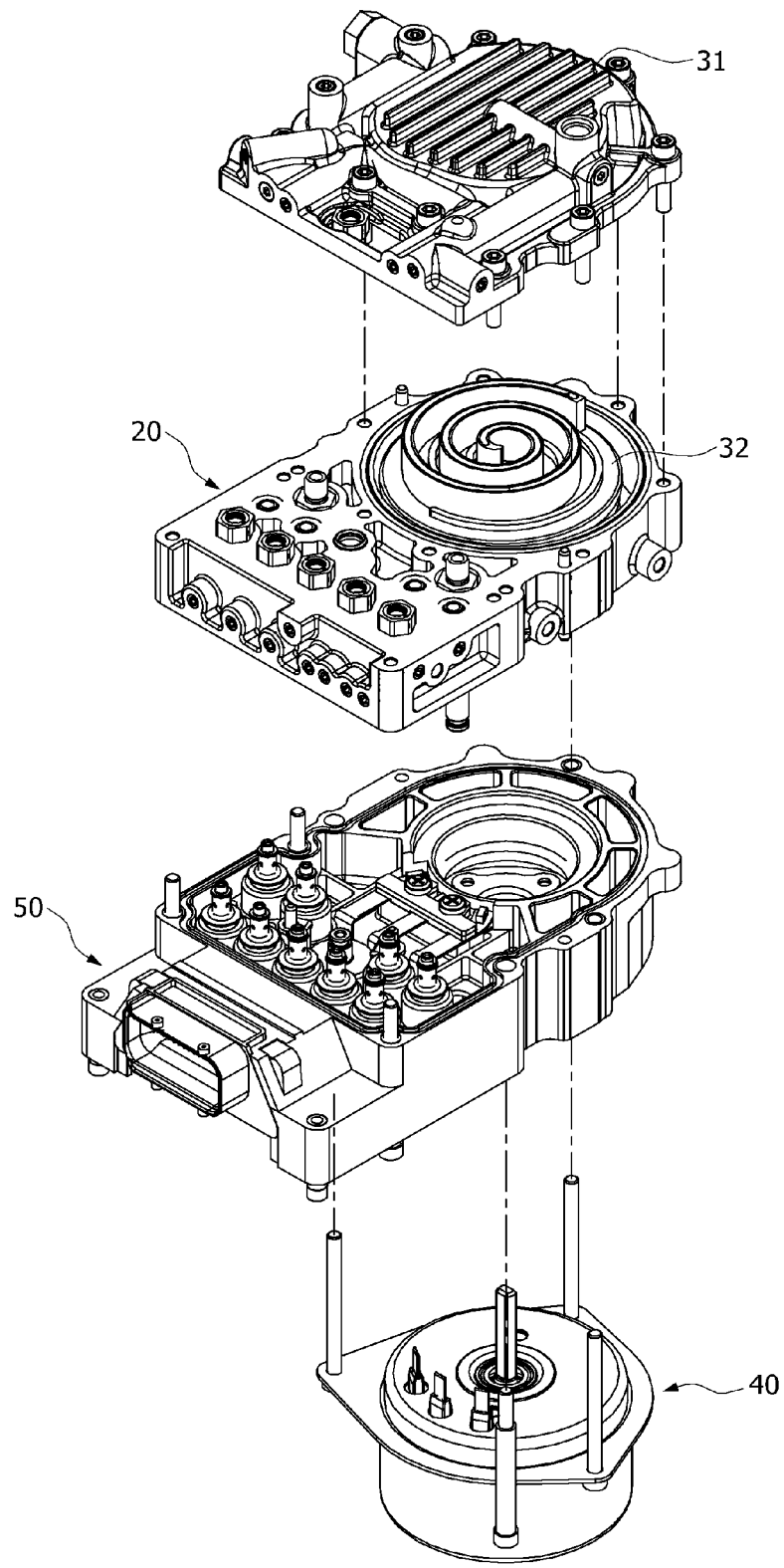
FIG. 2 is an exploded perspective view schematically illustrating the pneumatic adjustment apparatus for a vehicle according to an embodiment of the present disclosure.

FIG. 1 is a coupled perspective view schematically illustrating a pneumatic adjustment apparatus for a vehicle according to an embodiment of the present disclosure. FIG. 2 is an exploded perspective view schematically illustrating the pneumatic adjustment apparatus for a vehicle according to an embodiment of the present disclosure. Referring to FIGS. 1 and 2, a pneumatic adjustment apparatus 1 for a vehicle according to an embodiment of the present disclosure may include a block part 20 (for example, a block), a compression part 30 (for example, a compressor), a driving part 40 (for example, a driver), and a control part 50 (for example, a controller). A flow path part 90 (for example, a flow path) through which a fluid is moved may be formed in the block part 20. For example, the flow path part 90 may be formed within the block part 20. A part of the control part 50 may be inserted into the flow path part 90, and may open and close the flow path part 90.

The compression part 30 may be coupled with the block part 20, and may compress a fluid through communication with the flow path part 90. For example, a scroll compressor may be used as the compression part 30. The scroll compressor may perform continuous compression unlike a reciprocating compressor, and thus can reduce the occurrence of vibration and noise attributable to a pulsatory motion, thereby improving ride comfort of a vehicle.

The driving part 40 may be coupled with the block part 20 and connected to the compression part 30, and may drive the compression part 30. For example, the driving part 40 may be coupled with the bottom of the block part 20, and may rotate the compression part 30 when being supplied with a power supply.

The control part 50 may be coupled with the block part 20, and may open and close the flow path part 90. For example, the control part 50 may change a moving direction of a fluid that passes through the flow path part 90 by controlling a plurality of valves that is inserted into the block part 20. Accordingly, when a vehicle height is raised or lowered, the moving path of the fluid that passes through the flow path part 90 may be changed.

The pneumatic adjustment apparatus 1 for a vehicle according to an embodiment of the present disclosure may adjust a vehicle height by further including a storage tank part 10 (for example, a storage tank) and a vehicle height adjustment part 60 (for example, a vehicle height adjustor).

A fluid may be stored in the storage tank part 10. For example, the storage tank part 10 may be mounted on a vehicle body. Compressed air may be stored in the storage tank part 10. The storage tank part 10 may be connected to at least any one of the block part 20 and the compression part 30 by a connection hose.

The vehicle height adjustment part 60 may be connected to the block part 20, and may change the high and low (for example, the height) of the vehicle body by pneumatic pressure. For example, the vehicle height adjustment part 60 may be mounted on the vehicle body, and may support each wheel. When pneumatic pressure of the vehicle height adjustment part 60 is increased, a vehicle height may be raised because the length of the vehicle height adjustment part 60 is increased. When pneumatic pressure of the vehicle height adjustment part 60 is decreased, the vehicle height may be lowered because the length of the vehicle height adjustment part 60 is reduced. When oil pressure of the vehicle height adjustment part 60 is constantly maintained, the length of the vehicle height adjustment part 60 is not changed, and the vehicle height may be constantly maintained. The vehicle height adjustment part 60 may be connected to the block part 20 through a pneumatic pipe.

The pneumatic adjustment apparatus 1 for a vehicle is fabricated as one module, and can reduce a space and improve workability. That is, the block part 20 may be disposed under the compression part 30, the control part 50 may be disposed under the block part 20, and the driving part 40 may be disposed under the control part 50. For example, the block part 20, the compression part 30, the driving part 40, and the control part 50 may become one module by being coupled together. The compression part 30 may be assembled over the block part 20, the control part 50 may be assembled under the block part 20, and the driving part 40 may be assembled under the control part 50. Accordingly, the driving part 40 may be connected to the compression part 30 through the block part 20 and the control part 50.

Figure 3:
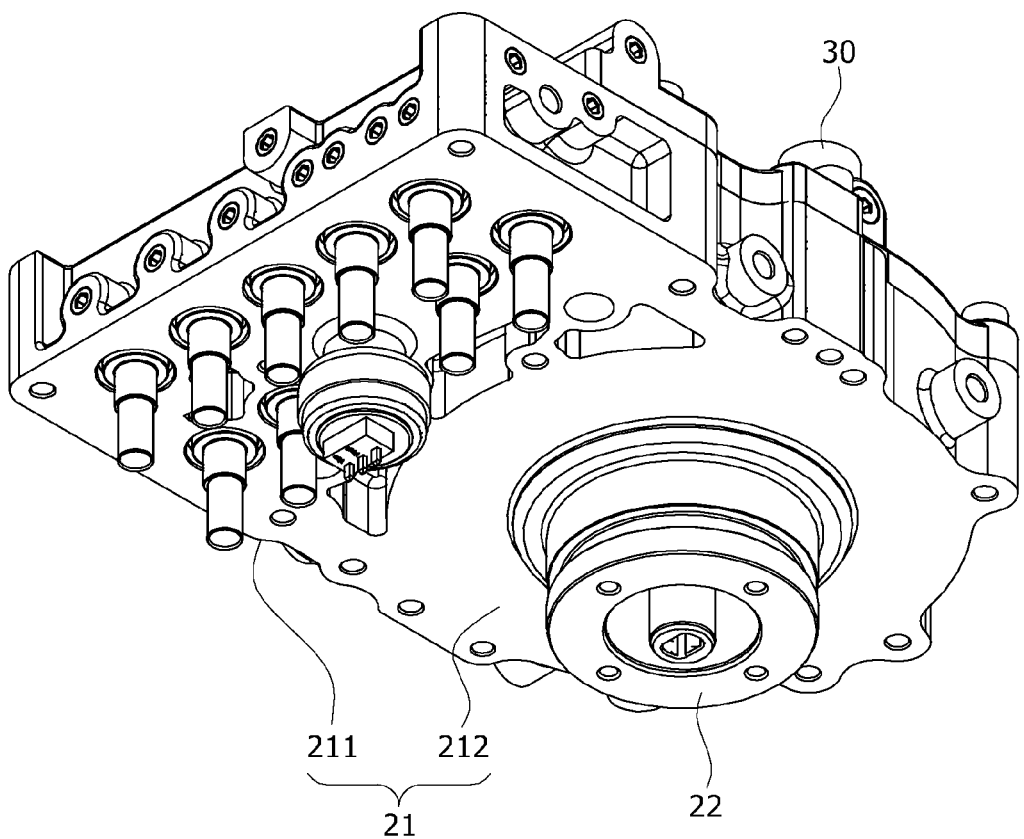
FIG. 3 is a bottom perspective view schematically illustrating a block part according to an embodiment of the present disclosure.
Figure 4:
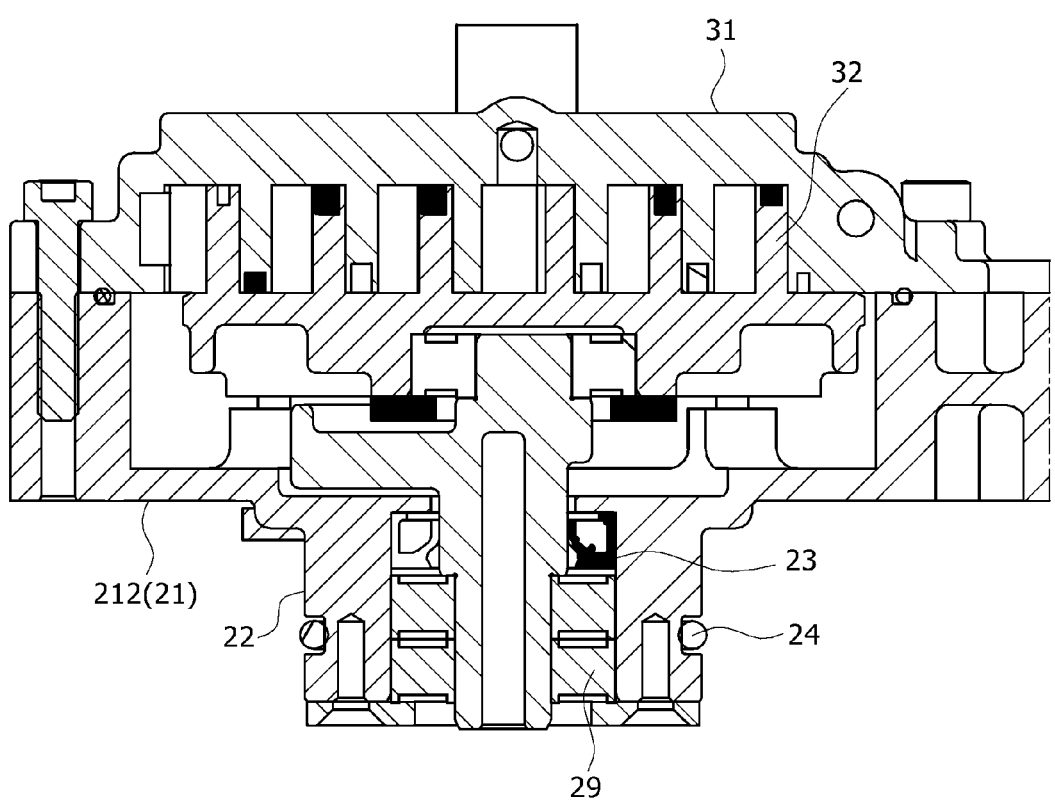
FIG. 4 is a cross-sectional view schematically illustrating the block part according to an embodiment of the present disclosure.

FIG. 3 is a bottom perspective view schematically illustrating the block part according to an embodiment of the present disclosure. FIG. 4 is a cross-sectional view schematically illustrating the block part according to an embodiment of the present disclosure. Referring to FIGS. 1 to 4, the block part 20 according to an embodiment of the present disclosure may include a block housing part 21 (for example, a block housing), a block support part 22 (for example, a block support), and a block sealing part 23 (for example, a block seal).

The block housing part 21 may be disposed between the compression part 30 and the control part 50. The flow path part 90 may be formed in the block housing part 21. For example, the block housing part 21 may include a block flow path part 211 in which the flow path part 90 is formed and which may guide a fluid, and a block compression part 212 (for example, a block compressor housing) that provides an operating space of the compression part 30. The block flow path part 211 and the block compression part 212 may be integrally formed, and may provide partitioned spaces. The block compression part 212 may have a shape the top of which has been opened.

The block support part 22 may be formed in the block housing part 21, and may support the compression part 30 so that the compression part 30 is rotatable. For example, the block support part 22 may protrude downward from the block compression part 212. The block support part 22 may be inserted into a space that is formed in the control part 50.

The block sealing part 23 may be formed in the block support part 22 and brought into (for example, close) contact with the compression part 30, and can maintain airtightness. For example, a support bearing 29 may be embedded in the block support part 22, and may support the rotation of the compression part 30. The block sealing part 23 that is disposed between the block support part 22 and the compression part 30 can prevent air leakage in an operating process of the compression part 30.

The block part 20 according to an embodiment of the present disclosure may further include a block O-ring part 24 (for example, a block O-ring). The block O-ring part 24 may be disposed between the block support part 22 and the control part 50, and can maintain airtightness. For example, the block O-ring part 24 may be disposed along an outer circumference of the block support part 22.

Figure 5:
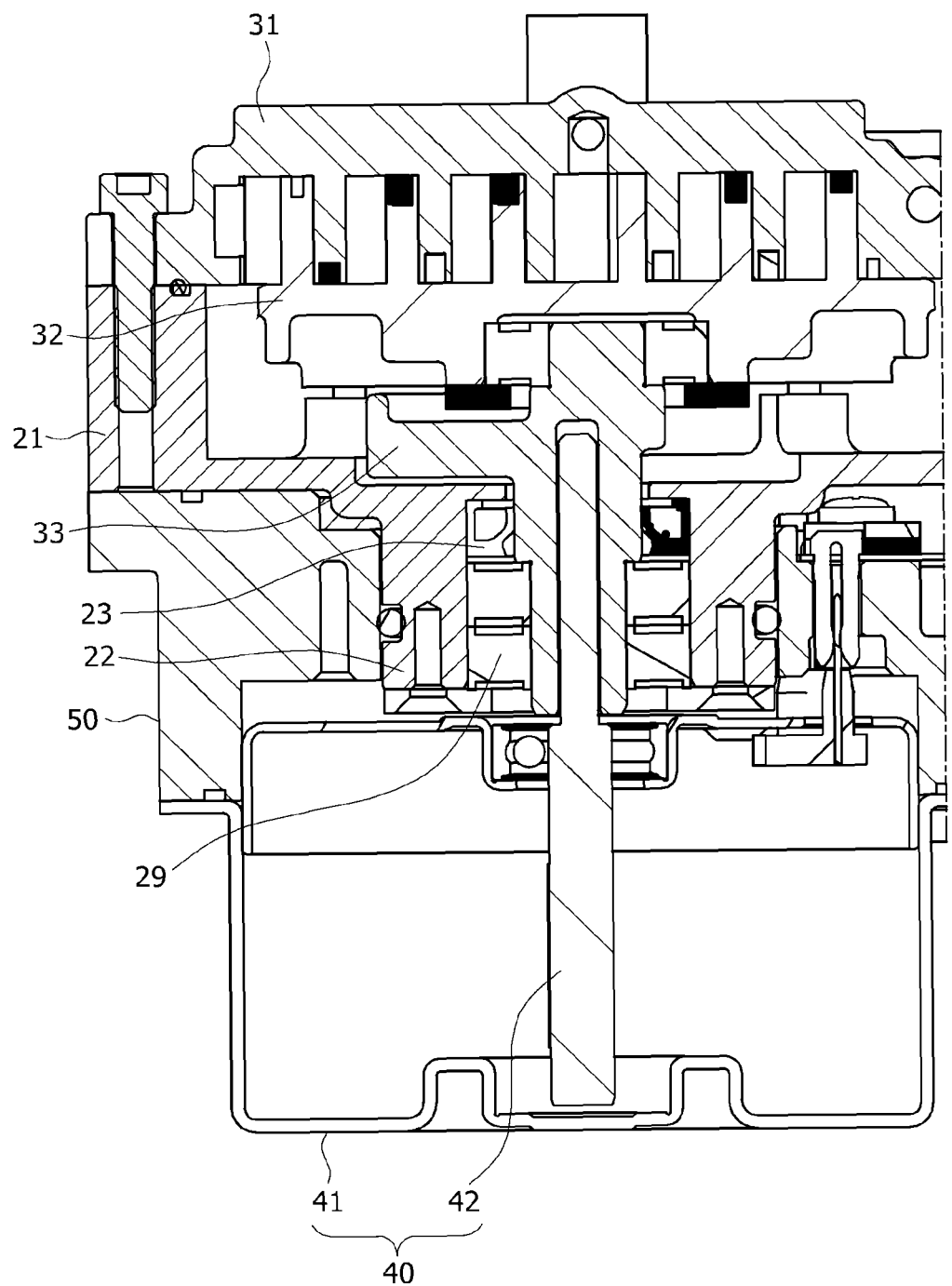
FIG. 5 is a cross-sectional view schematically illustrating a connection state of a compression part and a driving part according to an embodiment of the present disclosure.

FIG. 5 is a cross-sectional view schematically illustrating a connection state of the compression part and the driving part according to an embodiment of the present disclosure. Referring to FIG. 5, the compression part 30 according to an embodiment of the present disclosure may include a compression fixing part 31 (for example, a fixer), a compression rotation part 32 (for example, a rotator), and a compression transfer part 33 (for example, a transferor).

The compression fixing part 31 may be coupled with the top of the block part 20. For example, the compression fixing part 31 may cover an upper opened space of the block compression part 212. The compression fixing part 31 may have a fixed scroll shape of a scroll compressor.

The compression rotation part 32 may be rotatable within the compression fixing part 31. For example, the compression rotation part 32 may have a rotation scroll shape of a scroll compressor.

The compression transfer part 33 may be inserted into the block part 20, and may transfer rotatory power by connecting the compression rotation part 32 and the driving part 40. For example, the compression transfer part 33 may be rotated by being connected to the driving part 40 that penetrates the control part 50 and the block support part 22, and may be supported against the support bearing 29. The block sealing part 23 may be bought into close contact with the outside of the compression transfer part 33, and can prevent air leakage.

The driving part 40 may include a driving motor part 41 (for example, a motor) and a driving shaft part 42 (for example, a drive shaft). The driving motor part 41 may be coupled with the lower side of the control part 50. The driving shaft part 42 may be rotated by the driving motor part 41, and may be connected to the compression transfer part 33 through the control part 50. For example, the driving shaft part 42 may have an end having a faceted shape, and may be inserted into the compression transfer part 33 and may transfer rotatory power. In addition, the driving shaft part 42 may be coupled with the compression transfer part 33 through a spline connection. When an ECU, that is, vehicle control means, transmits a command to the control part 50 through LIN communication or a PWM signal, a command circuit within the control part 50 controls the driving motor part 41. Accordingly, a failure or an abnormal operation can be determined and performance of the driving motor part 41 can be adjusted through control of the speed of the driving motor part 41 because an operation of the compression part 30 can be monitored. Furthermore, a cost price can be reduced and the assembly can be improved because a part, such as an external relay or a wiring, is omitted.

Figure 6:
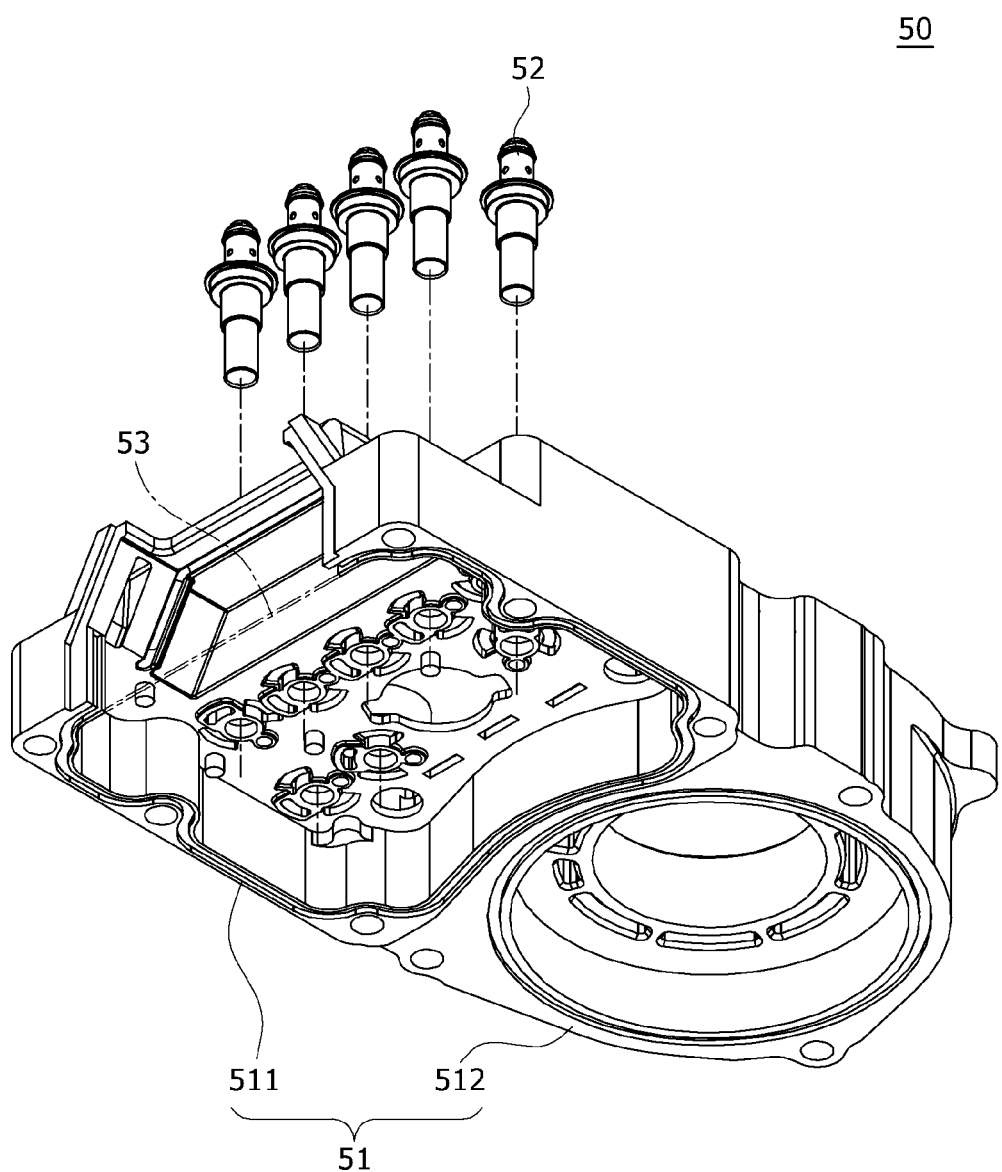
FIG. 6 is a bottom perspective view schematically illustrating a control part according to an embodiment of the present disclosure.

FIG. 6 is a bottom perspective view schematically illustrating the control part according to an embodiment of the present disclosure. Referring to FIG. 6, the control part 50 according to an embodiment of the present disclosure may include a control housing part 51 (for example, a controller housing), a control valve part 52 (for example, a control valve), and a control board part 53 (for example, a control board).

The control housing part 51 may be disposed between the block part 20 and the driving part 40. For example, the control housing part 51 may include a control manipulation part 511 (for example, a control manipulator) that provides an operating space of the control valve part 52 and a control mounting part 512 (for example, a control mount) that provides a mounting space of the block part 20 and the driving part 40. The control manipulation part 511 and the control mounting part 512 are integrally formed, but may have partitioned shapes. The driving motor part 41 may be mounted under the control mounting part 512. The block support part 22 may be inserted into the upper side of the control mounting part 512. The driving shaft part 42 may pass through the control mounting part 512, and may be connected to the compression transfer part 33 that has been embedded in the block support part 22.

The control valve part 52 may be mounted on the control housing part 51, and may open and close the flow path part 90. For example, a plurality of control valve parts 52 may be inserted into the flow path part 90.

The control board part 53 may be mounted on the control housing part 51, and may control the control valve part 52. For example, the control board part 53 may be mounted on the control housing part 51 and connected to the control valve part 52, and may provide the control valve part 52 with a control signal.

Figure 7:
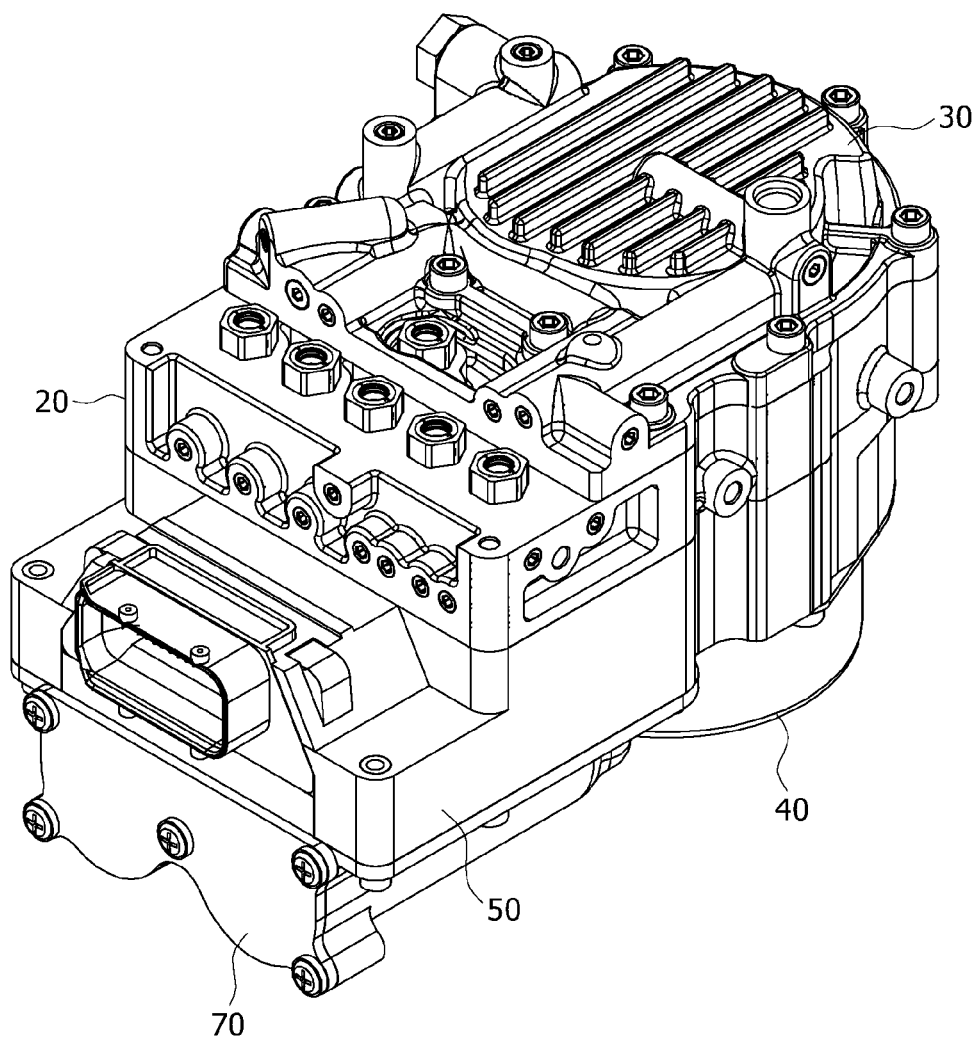
FIG. 7 is a diagram schematically illustrating the state in which a drying part according to an embodiment of the present disclosure has been integrally formed in the pneumatic adjustment apparatus for a vehicle.
Figure 8:
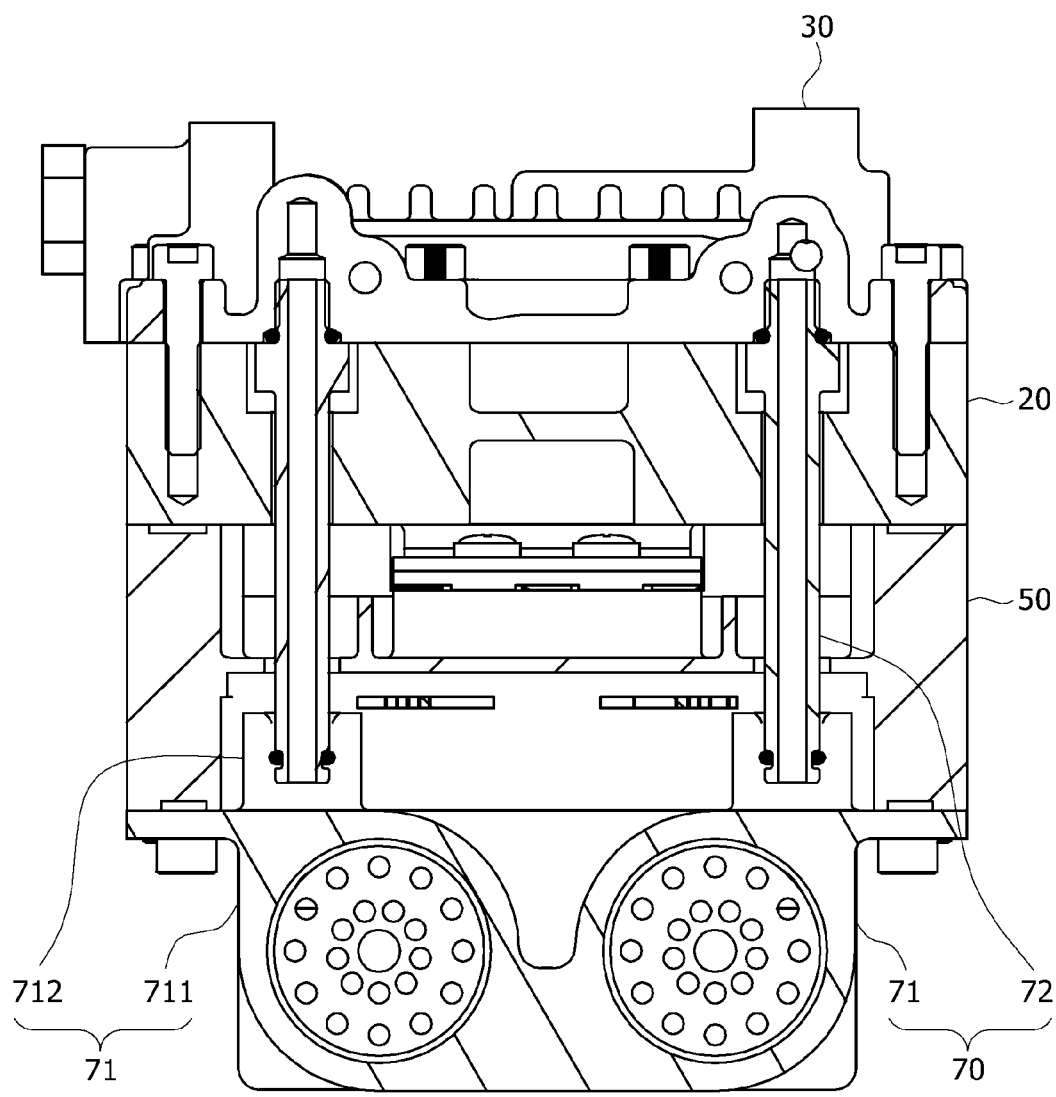
FIG. 8 is a cross-sectional view schematically illustrating a connection state of the drying part and the compression part according to an embodiment of the present disclosure.

FIG. 7 is a diagram schematically illustrating the state in which a drying part (for example, a dryer) according to an embodiment of the present disclosure has been integrally formed in the pneumatic adjustment apparatus for a vehicle. FIG. 8 is a cross-sectional view schematically illustrating a connection state of the drying part and the compression part according to an embodiment of the present disclosure. Referring to FIGS. 7 and 8, the pneumatic adjustment apparatus 1 for a vehicle according to an embodiment of the present disclosure may further include a drying part 70.

The drying part 70 may be disposed under the control part 50 and connected to the compression part 30, and may dry a fluid. For example, the drying part 70 may be mounted on the bottom of the control manipulation part 511.

The drying part 70 may include a drying housing part 71 (for example, a dryer housing) and a drying line part 72 (for example, a dryer line).

The drying housing part 71 may be mounted on the bottom of the control part 50, and may dry a fluid. For example, the drying housing part 71 may dry a fluid that passes therethrough, and may include a drying body part 711 that is installed in the control manipulation part 511 and one or more drying connection parts 712 that protrude upward from the drying body part 711 and that make a fluid pass therethrough. The top of the drying body part 711 may cover the bottom of the control manipulation part 511 the lower side of which has been opened.

The drying line part 72 may penetrate the control part 50 and the block part 20, and may guide a fluid by connecting the compression part 30 and the drying housing part 71. For example, the drying line part 72 may have a top connected to the compression part 30, and may have a bottom connected to the drying connection part 712. One or more drying line parts 72 may be formed, if necessary.

Figure 9:
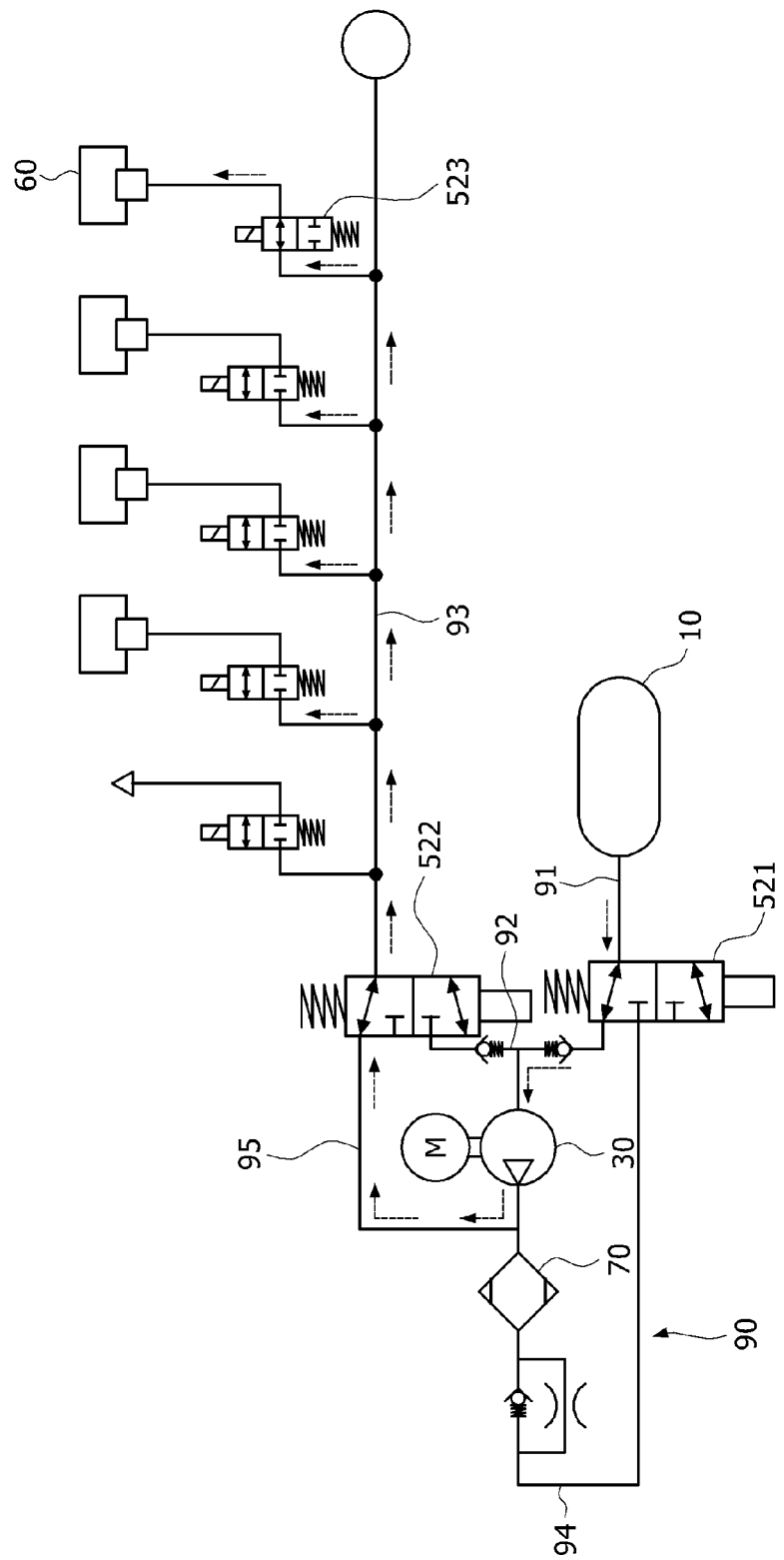
FIG. 9 is a diagram schematically illustrating a movement of a fluid when a vehicle height is raised in the pneumatic adjustment apparatus for a vehicle according to an embodiment of the present disclosure.
Figure 10:
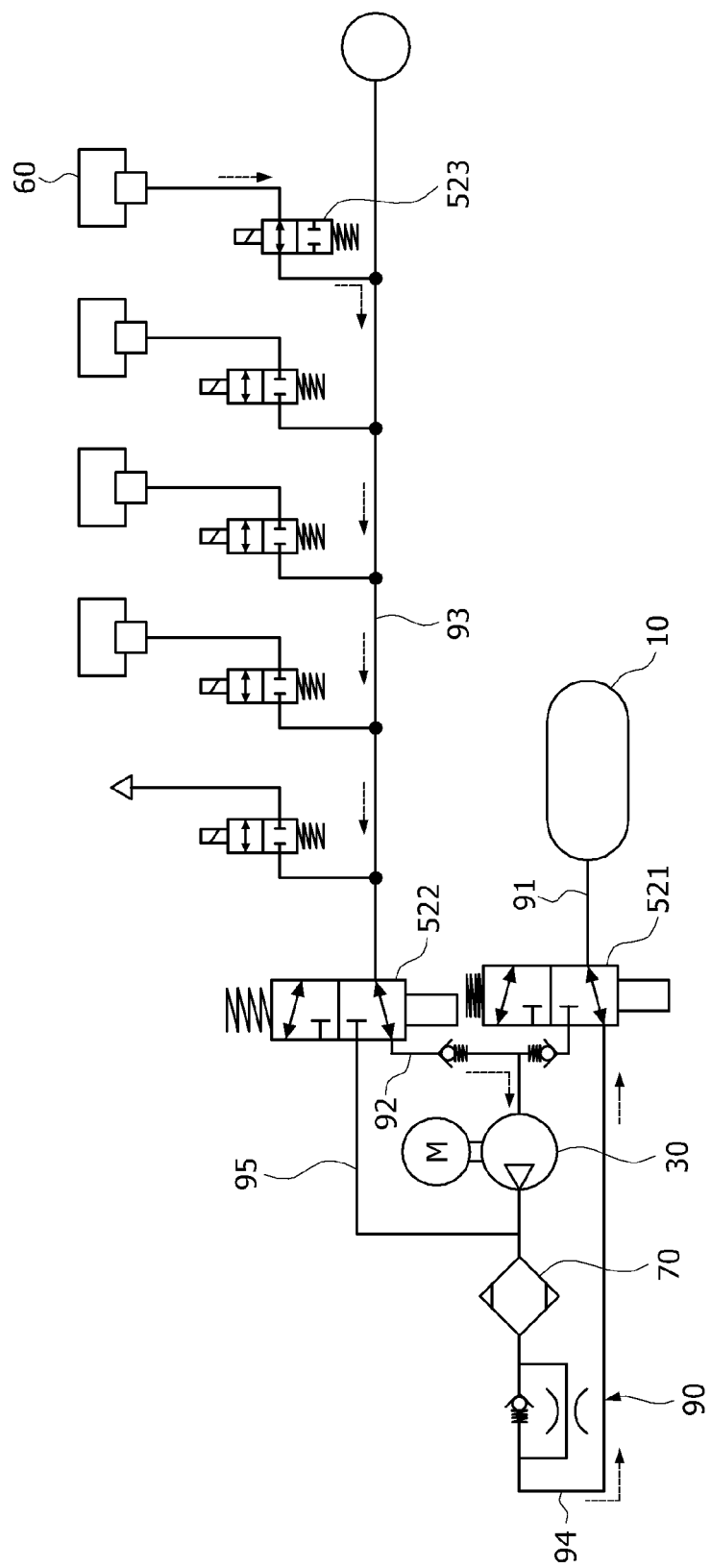
FIG. 10 is a diagram schematically illustrating a movement of a fluid when a vehicle height is lowered in the pneumatic adjustment apparatus for a vehicle according to an embodiment of the present disclosure.

FIG. 9 is a diagram schematically illustrating a movement of a fluid when a vehicle height is raised in the pneumatic adjustment apparatus for a vehicle according to an embodiment of the present disclosure. FIG. 10 is a diagram schematically illustrating a movement of a fluid when a vehicle height is lowered in the pneumatic adjustment apparatus for a vehicle according to an embodiment of the present disclosure. Referring to FIGS. 9 and 10, the flow path part 90 according to an embodiment of the present disclosure may include a first flow path part 91, a second flow path part 92, a third flow path part 93, a fourth flow path part 94, and a fifth flow path part 95. In this case, the control valve part 52 may include a first valve part 521 (for example, a first valve), a second valve part 522 (for example, a second valve), and a third valve part 523 (for example, a third valve).

The first flow path part 91 may connect the storage tank part 10 and the first valve part 521. The second flow path part 92 may connect the first valve part 521 and the second valve part 522. The third flow path part 93 may connect the second valve part 522 and the vehicle height adjustment part 60. The third flow path part 93 may be branched in a way to be connected to the vehicle height adjustment part 60 that is mounted on each wheel, and may be opened and closed by the third control valve part 523.

The fourth flow path part 94 may connect the second flow path part 92 and the first control valve part 521, and may guide a fluid to the compression part 30 and the drying part 70. The fifth flow path part 95 may connect the fourth flow path part 94 and the second control valve part 522. For example, the compression part 30 and the drying part 70 may be disposed on the fourth flow path part 94. The fifth flow path part 95 may be connected to the fourth flow path part 94 that is disposed between the compression part 30 and the drying part 70. In this case, any one or more of the fourth flow path part 94 and the fifth flow path part 95 may include the drying line part 72.

The first valve part 521 may connect the first flow path part 91 and the second flow path part 92 or may connect the first flow path part 91 and the fourth flow path part 94. The second valve part 522 may connect the second flow path part 92 and the third flow path part 93 or may connect the third flow path part 93 and the fifth flow path part 95.

For raising a vehicle height, the first valve part 521 connects the first flow path part 91 and the second flow path part 92, and the second valve part 522 connects the third flow path part 93 and the fifth flow path part 95 (refer to FIG. 9). In this state, a fluid that has been stored in the storage tank part 10 may be compressed by the compression part 30 while being moved to the first flow path part 91, the second flow path part 92, and the fourth flow path part 94, and the compressed fluid may be moved to the fifth flow path part 95 and the third flow path part 93. Furthermore, when the third flow path part 93 to which each third valve part 523 has been selectively branched is opened, pressure of the vehicle height adjustment part 60 of a selected wheel is increased and the height of the vehicle body may be raised.

In contrast, if a vehicle height is lowered, the first valve part 521 connects the first flow path part 91 and the fourth flow path part 94, and the second valve part 522 connects the second flow path part 92 and the third flow path part 93 (refer to FIG. 10). In this state, a fluid that has been stored in the vehicle height adjustment part 60 may be sequentially moved to the third flow path part 93, the second flow path part 92, the fourth flow path part 94, and the first flow path part 91, and may be stored in the storage tank part 10. At this time, the fluid may be compressed by the compression part 30, and may be dried by the drying part 70.

Figure 11:
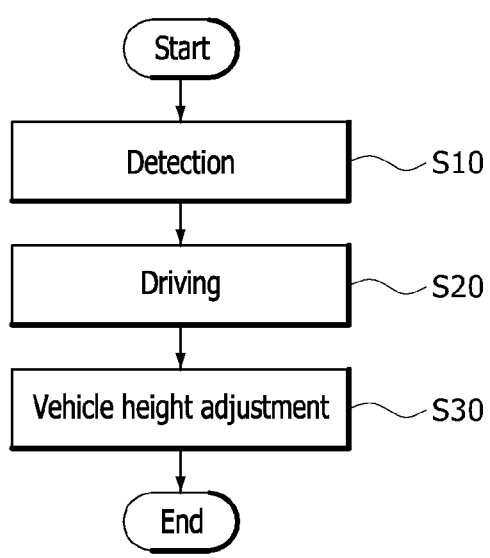
FIG. 11 is a flowchart schematically illustrating a method of adjusting pneumatic pressure for a vehicle according to an embodiment of the present disclosure.

FIG. 11 is a flowchart schematically illustrating a method of adjusting pneumatic pressure for a vehicle according to an embodiment of the present disclosure. The method of adjusting pneumatic pressure for a vehicle according to an embodiment of the present disclosure is described as follows with reference to FIG. 11.

In a detection step S10, a detection part 80 may detect a vehicle driving state. For example, the detection part 80 may detect a bent road surface state, a climate state such as the wind, or a position state through navigation.

In a driving step S20, the modulated block part 20, compression part 30, driving part 40, and control part 50 may be driven in response to a detection signal of the detection part 80. For example, the block part 20, the compression part 30, the driving part 40, and the control part 50 may be modulated (for example, the block part 20, the compression part 30, the driving part 40, and the control part 50 may be implemented and addressed (or controlled) as an integrated module). The storage tank part 10 and the vehicle height adjustment part 60 may be connected to the block part 20. Furthermore, the control part 50 may be connected to the detection part 80. The control part 50 that has received the detection signal of the detection part 80 may transmit a control signal to the driving part 40. When the driving part 40 that has received the control signal is driven, the compression part 30 may compress a fluid.

In the adjustment step S30, as the fluid is moved to the storage tank part 10 or the vehicle height adjustment part 60, a vehicle height may be adjusted. For example, in the adjustment step S30, the control valve part 52 may be operated in response to a control signal of the control part 50, and a movement line of the fluid in the flow path part 90 may be changed. If the vehicle height is to be raised, the fluid that has been stored in the storage tank part 10 may be compressed by the compression part 30 and then supplied to the vehicle height adjustment part 60. In contrast, if the vehicle height is to be lowered, the fluid that is discharged by the vehicle height adjustment part 60 may be stored in the storage tank part 10 after passing through the compression part 30.

In the pneumatic adjustment apparatus 1 for a vehicle according to an embodiment of the present disclosure, after a fluid is supplied to the modulated block part 20, compression part 30, driving part 40, and control part 50 and is then compressed, the compressed fluid is used to control pneumatic pressure of a vehicle, and can adjust the high and low of the vehicle body because the block part 20 is connected to the vehicle height adjustment part 60. The pneumatic adjustment apparatus 1 for a vehicle can increase a vehicle height adjustment speed by applying the closed pneumatic circuit, and can selectively apply pneumatic pressure to a point at which the vehicle height needs to be adjusted.

Various embodiments are directed to a pneumatic adjustment apparatus and method for a vehicle, which can suppress vibration and noise and can increase a vehicle height adjustment speed and supply pneumatic pressure by applying a closed pneumatic circuit.

In the pneumatic adjustment apparatus and method for a vehicle according to the present disclosure, after a fluid is supplied to the modulated block part, compression part, driving part, and control part and is then compressed, the compressed fluid is used to control pneumatic pressure of a vehicle, and can adjust the high and low of a vehicle body because the block part is connected to the vehicle height adjustment part. The pneumatic adjustment apparatus for a vehicle can increase a vehicle height adjustment speed by applying the closed pneumatic circuit, and can selectively apply pneumatic pressure to a point at which the vehicle height needs to be adjusted.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A pneumatic adjustment apparatus for a vehicle, comprising:
    a block including a flow path formed therein, the flow path being configured for a fluid to move through the block;
    a compressor coupled with the block and configured to communicate with the flow path and to compress the fluid;
    a driver coupled with the block, connected to the compressor, and configured to drive the compressor; and
    a controller coupled with the block and configured to open and close the flow path,
    wherein the block comprises:
        a block housing disposed between the compressor and the controller, wherein the flow path is at least partially formed within the block housing;
        a block support disposed in the block housing and configured to support the compressor so that the compressor is rotatable; and
        a block seal disposed in the block support, in contact with the compressor, and configured to maintain airtightness.

2. The pneumatic adjustment apparatus of claim 1, wherein the block further comprises a block O-ring disposed between the block support and the controller and configured to maintain airtightness.

3. The pneumatic adjustment apparatus of claim 1, wherein the compressor comprises:
    a fixer coupled with a top of the block;
    a rotator rotatable within the fixer; and
    a transferor inserted into the block and configured to transfer rotatory power by connecting the rotator and the driver.

4. The pneumatic adjustment apparatus of claim 3, wherein the driver comprises:
    a motor coupled with a bottom of the controller; and
    a drive shaft rotated by the motor and connected to the transferor by the controller.

5. The pneumatic adjustment apparatus of claim 1, wherein the controller comprises:
    a controller housing disposed between the block and the driver;
    a control valve mounted on the controller housing and configured to open and close the flow path; and
    a control board mounted on the controller housing and configured to control the control valve.

6. The pneumatic adjustment apparatus of claim 1, further comprising a dryer disposed under the controller, connected to the compressor, and configured to dry the fluid.

7. The pneumatic adjustment apparatus of claim 6, wherein the dryer comprises:
    a dryer housing mounted on a bottom of the controller and configured to dry the fluid; and
    a dryer line configured to penetrate the controller and the block and guide the fluid by connecting the compressor and the dryer housing.

8. The pneumatic adjustment apparatus of claim 6, further comprising:
    a vehicle height adjustor connected to the block and configured to change a height of a vehicle body responsive to pneumatic pressure applied thereto.

9. The pneumatic adjustment apparatus of claim 8, wherein the flow path comprises:
    a first flow path connecting a storage tank and a first valve;
    a second flow path connecting the first valve and a second valve;
    a third flow path connecting the second valve and the vehicle height adjustor and opened and closed by a third valve;
    a fourth flow path connecting the second flow path and the first valve and to guide the fluid to the compressor and the dryer; and
    a fifth flow path connecting the fourth flow path and the second valve.

10. A pneumatic adjustment apparatus for a vehicle, comprising:
    a block including a flow path at least partially formed therein, the flow path configured for a fluid to move through the block;
    a compressor coupled to the block and configured to communicate with the flow path and to compress the fluid;
    a driver coupled with the block, connected to the compressor, and configured to drive the compressor; and
    a controller coupled with the block and configured to open and close the flow path;
    a dryer disposed under the controller, connected to the compressor, and configured to dry the fluid;
    a storage tank connected to the block and configured to store the fluid; and
    a vehicle height adjustor connected to the block and configured to change a height of a vehicle body by pneumatic pressure,
    wherein the block is disposed under the compressor, the controller is disposed under the block, and the driver is disposed under the controller.

11. The pneumatic adjustment apparatus of claim 10, wherein the block comprises:
   a block housing comprising a block flow path and a block compressor housing, the block flow path being disposed between the compressor and the controller and configured to have the flow path formed therein and to guide the fluid, the block compressor housing being configured to provide an operating space of the compressor;
   a block support disposed in the block housing, configured to protrude downward from the block compressor housing and to support the compressor so that the compressor is rotatable, and inserted into the controller; and
   a block seal disposed in the block support, bought into contact with the compressor, and configured to maintain airtightness.

12. The pneumatic adjustment apparatus of claim 11, wherein the block further comprises a block O-ring part disposed between the block support and the controller and configured to maintain the airtightness.

13. The pneumatic adjustment apparatus of claim 11, wherein the compressor comprises:
   a fixer coupled to a top of the block and configured to cover an upper opened space of the block compressor housing;
   a rotator rotatable within the fixer; and
   a transferor inserted into the block and configured to transfer rotatory power by connecting the rotator and the driver.

14. The pneumatic adjustment apparatus of claim 13, wherein the transferor is configured to be rotated by being connected to the driver that penetrates the controller and the block support, and is supported against a support bearing.

15. The pneumatic adjustment apparatus of claim 13, wherein the driver comprises:
   a motor coupled with a bottom of the controller; and
   a drive shaft rotated by the motor and connected to the transferor through the controller.

16. The pneumatic adjustment apparatus of claim 15, wherein the controller comprises:
   a controller housing disposed between the block and the driver;
   a control valve mounted on the controller housing and configured to open and close the flow path; and
   a control board mounted on the controller housing and configured to control the control valve.

17. The pneumatic adjustment apparatus of claim 16, wherein the controller housing comprises:
   a control manipulator configured to provide an operating space of the control valve; and
   a control mount configured to provide a mounting space of the block and the driver,
   wherein the control manipulator and the control mount are integrally formed.

18. The pneumatic adjustment apparatus of claim 17, wherein:
   the motor is mounted under the control mount,
   the block support is configured to be inserted into an upper side of the control mount, and
   the drive shaft is connected to the transferor embedded in the block support through the control mount.

19. A method of adjusting pneumatic pressure for a vehicle, the method comprising:
   detecting, by one or more processors, a vehicle driving state;
   compressing, by a compressor, a fluid when a driver is driven in response to a control signal of a controller that receives a detection signal, wherein a block, the compressor, the driver, and the controller form an integrated module; and
   adjusting a vehicle height based on either
      moving the fluid to a storage tank, or
      implementing a vehicle height adjustor,
   wherein the block comprises:
      a block housing disposed between the compressor and the controller, wherein the flow path is at least partially formed within the block housing;
      a block support disposed in the block housing and configured to support the compressor so that the compressor is rotatable; and
      a block seal disposed in the block support, in contact with the compressor, and configured to maintain airtightness.

* * * * *